Oct. 27, 1964   W. H. STRUTHERS   3,154,607
METHOD OF MAKING A CUSHION
Original Filed Oct. 4, 1957   2 Sheets-Sheet 1
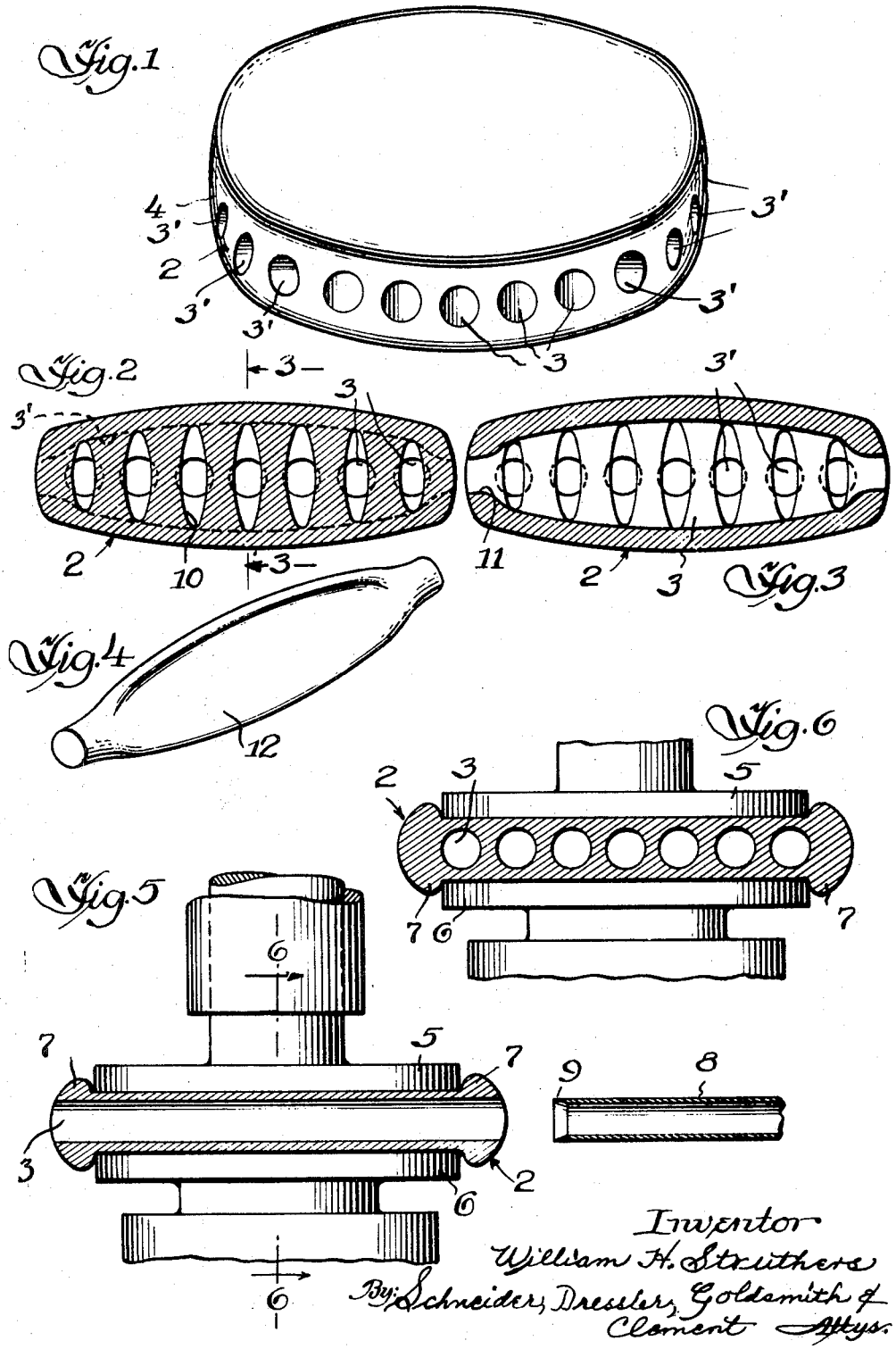

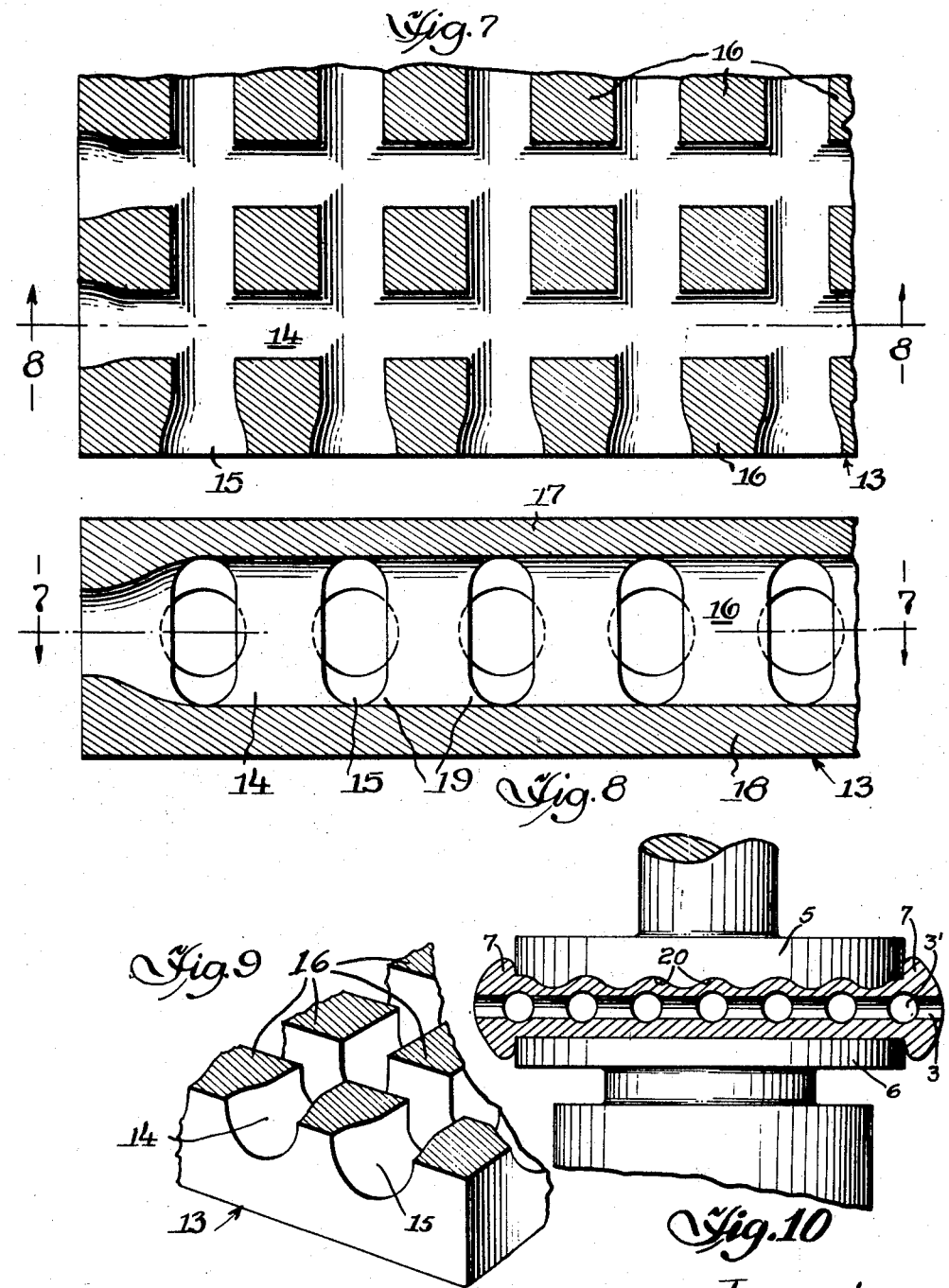

United States Patent Office 3,154,607
Patented Oct. 27, 1964

3,154,607
METHOD OF MAKING A CUSHION
William H. Struthers, Chicago, Ill., assignor, by mesne assignments, to Fiber Bond Corporation, Chicago, Ill., a corporation of Illinois
Original application Oct. 4, 1957, Ser. No. 688,229, now Patent No. 3,046,004, dated July 24, 1962. Divided and this application July 10, 1962, Ser. No. 217,506
9 Claims. (Cl. 264—54)

This invention relates to a method of making a cushion of compressible cellular material, with particular reference to means for controlling the compressibility of the material throughout the cushion.

This application is a division of my prior application, Serial No. 688,229, filed October 4, 1957, which issued as Patent No. 3,046,004, on July 24, 1962.

The term "cushion" is used broadly and includes all types of seat cushions, upholstery, pillows, mattresses, and similar articles.

Although the cushion may be made of any suitable compressible cellular material, such as, for example, foamed rubber, it is preferred to use a foamed resin. Suitable foaming resin compositions are disclosed in U.S. Patents Nos. 2,461,942; 2,498,621; 2,572,568; 2,577,279; and 2,623,023. Other foamable resin compositions may, of course, be used. The preferred compressible material is polyurethane foamed resinous material, suitably of the polyether or polyester type. These foamable plastic compositions, as is known, contain blowing agents which engender gases upon being heated to proper temperatures, such as carbon dioxide, ammonium carbonate, diazo aminotoluene, diazo diisobutyronitrile, hydrogen peroxide, and the like.

In practice, the blowing agents are mechanically admixed with suitable plastic materials or mixtures thereof, such as synthetic plastic materials like polyurethane polyesters and polyurethane polyethers; polyvinyl chloride and copolymers of vinyl chloride and other polymerizable monomers such as vinyl acetate; alkyd resins; phenol-formaldehyde resins; synthetic rubbers like butadiene-acrylonitrile copolymers, and the like. The particular foamable material employed will obviously depend upon the physical characteristics desired in the finished product.

Polyurethane foamed resinous material of either the polyether or polyester type is substantially lighter than foamed rubber and possesses certain characteristics that make it eminently suitable for use as a cushioning material in accordance with the present invention.

Thus, the polyurethane foamed resins may be drilled without crumbling. Also, they may be sterilized without undergoing any more than insubstantial deterioration, if any.

Both foamed rubber and foamed polyurethane resins have a tough outer skin when they are foamed to the desired shape in a closed mold. When the foamed material hits the surface of the mold the porous cell structure collapses to form the tough outer skin. This outer skin is substantially incompressible and gives the cushion an initial resistance to compression that is very undesirable in a cushion. Although the provision of bores extending through a cushion will increase its compressibility, this initial resistance to compression cannot be eliminated by molding the foamed material with bores extending therethrough because the same tough, rubbery skin would also be formed on the surfaces of the bores, and the initial resistance to compression of the cushion would remain.

In accordance with the present invention, the compressibility of the cushion is increased after it is molded in the desired shape, by drilling a plurality of bores through the cushion, while it is held under compression. By controlling the compression of the cushion in different areas while the cushion is being drilled, it is possible to vary the density throughout the cushion, and provide different degrees of compressibility at various points in the cushion. This variance in the compressibility of the cushion is of particular advantage in connection with mattresses, in which it may be desirable to provide a firmer structure in predetermined areas and softer structure in other areas. Bores may be provided in any or all directions through the cushion, either with or without prior compression, to provide "breathing" for the cushion.

The advantage of drilling the bores through the cushion after it has been molded in the desired shape is that no skin is formed on the surfaces defining the bores, as in the case when the foamed material is molded with the bores in place. Furthermore, it is comparatively expensive to mold the bores in place because the cushions would have to be molded in half sections and then adhered together, as in the case of pillows and mattresses of foamed rubber presently available commercially.

The bores may be drilled by tubular drills having a sharpened edge so that the portion removed from the cushion may be received within the tubular drill. A plurality of drills are preferably ganged together to provide a multiple drill for forming a plurality of bores simultaneously. The cushion is clamped between two pressure plates and is compressed and held in a compressed state while it is being drilled. Preferably the cushion is provided with two series of bores, with the bores of one series extending at right angles to the bores of the other series, and the pressure plates are kept in place until the drilling is complete in each direction being drilled. The bores in any one series may extend in any desired direction with respect to the bores in the other series and the bores in any one series may extend in any desired direction. There may, of course, be any desired number of bores or any desired number of series of bores in the cushion.

The cushion may be compressed throughout its area and so held as it is being bored, but preferably the outer edges are not compressed, so that the bores at the peripheral edges of the cushion will appear to be of the same shape as the drilling tube. The compression of the center portion of the cushion will cause the outer edge portion to expand if it is not confined. If the cushion is drilled under such condition, upon removal of the drilled cushion it will be found that the openings at the peripheral edge of the cushion will be smaller than the circumference of the drill and the edge of the cushion will be relatively firm. The inner portion of the cushion will have openings of substantially larger dimensions than the diameter of drill, depending upon the compression of the cushion. Thus, the inner portion will be relatively soft.

The structure by means of which the above and other advantages are attained, and the method used to produce the cushion embodying these advantages, will be described in detail in the following specification, taken in conjunction with the accompanying drawings, showing a few preferred illustrative embodiments of the invention, in which:

FIG. 1 is a perspective view of a round cushion having two series of bores drilled therethrough at right angles to each other, showing the openings at one peripheral edge portion of the cushion;

FIG. 2 is a cross sectional view through the center of the cushion shown in FIG. 1;

FIG. 3 is a cross sectional view, taken along the line 3—3 of FIG. 2;

FIG. 4 is a detail perspective view of the core of material removed from one of the bores in the cushion;

FIG. 5 is a diagrammatical view showing the cushion in section, held between two pressure plates and showing one end of a drill removed from the cushion after the first drilling operation;

FIG. 6 is a cross sectional view showing the cushion still under compression after the initial drilling operation, taken along the line 6—6 of FIG. 5;

FIG. 7 is a fragmentary cross sectional view of a cushion having bores in two directions, taken along the line 7—7 of FIG. 8, and showing the interior integral support structure of the cushion;

FIG. 8 is a fragmentary cross sectional view, taken along the line 8—8 of FIG. 7;

FIG. 9 is a fragmentary perspective view of the interior support structure of the cushion shown in FIG. 7; and FIG. 10 is a diagrammatical view showing the cushion, in section, held between two pressure plates applying compressive forces of varying intensities after two series of holes have been drilled through the cushion at right angles to each other.

Referring to FIGS. 1 to 6 of the drawings, the reference numeral 2 indicates a cushion of any suitable compressible material, preferably a resinous material, that has been foamed in a closed mold to give it the desired shape. The cushion may be shaped round or rectangular or of other shape for use as a pillow for seating or sleeping purposes, as a pad for a chair or stool, as a mattress, or as the back or seat of upholstered furniture. The top and bottom surfaces of the cushion may be flat or crowned, or of any desired configuration. The advantages of the invention are most fully utilized in cushion structures in which varying degrees of compressibility are desired in different portions of the cushion. The cushion has imperforate surfaces when it is formed in a closed mold, since the porous cell structure collapses to form a thin, tough outer skin where the foamable material comes in contact with the walls of the mold during foaming. These surfaces may, of course, be cut away if they are found to be undesirable.

Although polyurethane foamed resinous material of either the polyether or polyester type is the preferred foamed material in accordance with the invention, the invention also contemplates the use of any foamed material, such as, for example, vinyl resin foam or rubber foam. The polyurethane foamed resinous composition is lighter and has more compressibility than rubber foam. It also has greater resistance to oxidation and sunlight than rubber foam. Other advantages of the polyurethane foamed resinous material are that it can be sterilized, and when it is drilled, the walls contiguous to the bore will not crumble.

In order to overcome the initial resistance to compression caused by the tough outer skin of the foamed material when it is foamed in a closed mold, a plurality of bores 3 and 3' are drilled into the cushion through the peripheral edge 4 while the cushion is held under compression, as shown in FIGS. 5, 6 and 10. The bores are drilled into the peripheral edge so as to leave the top and bottom surfaces of the cushion imperforate. The bores 3 and 3' are preferably drilled entirely through the cushion, but may terminate at any point within the cushion. The termination of some of the bores within the body portion of the cushion provides predetermined areas of greater firmness than the areas where the bores go entirely through the cushion. For example, in a mattress, the bores may be drilled part way through the mattress from each end, thus providing relatively soft end portions and a relatively firm center portion. It is also possible to drill bores through one side of a mattress to provide a mattress having one half relatively soft and the other half relatively firm.

The bores may be of uniform size throughout the cushion, but many advantages are attained by varying the cross sectional area of the bores as they extend into the cushion. The variation in the cross sectional area of the bores is obtained by maintaining portions of the cushion under compression or different portions under varying degrees of compression as the bores are being drilled. Control of the compressive forces makes it possible to provide the cushion with different predetermined degrees of compressibility throughout the area of the cushion. As shown in FIGS. 5 and 6, the center portion of the cushion 2 is compressed between two flat pressure plates 5 and 6. Preferably the peripheral edge portions of the cushion extends beyond the outer edges of the pressure plates, causing the edges of the cushion to expand, as indicated at 7.

While the cushion is thus held under compression, one or more bores is drilled by means of a drill comprising a hollow steel tube 8 having a sharp cutting edge 9. The drill is of uniform size throughout its length. The drill is rotated by any suitable means and is forced through the cushion. Although a single drill is shown, it will be understood that a multiple gang of drills may be used to provide a plurality of bores 3 or 3' in a single drilling operation. Each drill is longer than the diameter of the cushion so that it may be driven part way or entirely through the cushion. The material that is cut out of the cushion by each drill moves into the center of the drill as the drill is advanced into the cushion, and therefore does not interfere with the drilling operation.

After the drills are removed and the pressure plates are separated, the cushion expands to its normal size, and the bores throughout the area of the cushion that was compressed during the drilling operation contract slightly in the direction perpendicular to the pressure and become elongated in the direction parallel to the pressure, as indicated at 10 in FIG. 2. The bores contract in both directions in the peripheral edge portions, which are expanded during the drilling operation, so that the holes visible at the outer edge of the cushion are actually smaller than the circumference of the drill, as shown at 11, FIG. 3. The shape of the core 12 of material removed from each bore by the drill during the first drilling, shown in FIG. 4, gives a good idea of the interior shape of the bores after the first drilling and the subsequent removal of the compression plates and expansion of the cushion. The interior shape of the bores becomes quite complex when there are drillings in transverse directions, as indicated in FIGS. 2, 3, 7, 8, 9 and 10.

It will be seen, from FIGS. 3 and 4, that the cross sectional area of each bore varies throughout its length, and is larger within the body of the cushion than at its peripheral edge portion. The compressibility of the cushion is greater, of course, where the cross sectional area of the bore is larger. The compressibility of the cushion may be varied, throughout the area of the cushion, by varying the pressure applied by the pressure plates 5 and 6 in accordance with any predetermined pattern. When the top or bottom surface of the cushion is crowned, as shown in FIGS. 2 and 3, the application of flat plates to these surfaces applies more pressure to the center portion of the cushion than to the other areas thereof. If the pressure plates 5 and 6 are set to apply the maximum desired pressure, the pressure in predetermined areas may be reduced by having a relief surface on the pressure plates at that area, as indicated at 20, in FIG. 10, instead of the flat surface indicated in FIGS. 5 and 6. The small cross section of the openings in the peripheral edges provides a relatively firm edge for the cushion.

Although a cushion having a single series of bores extending in only one direction will provide many advantages of the present invention, it is preferred to provide a second series of bores 3' extending at right angles, or any other desired angle, to the first series. When pressure is applied to a cushion having bores in only one direction the upper portion of the cushion has a tendency to slip transversely of the bores. It is preferred to maintain the pressure on the cushion until both series of bores 3 and 3' are drilled, thus providing a cushion of substantially uniform compressibility and stability. The compressed cushion assemblage may be rotated through any desired angle, preferably 90°, after the first drilling operation, and the cushion then again drilled, or a second gang of drills disposed at the desired angle to the first gang may be used for the second drilling operation.

A cushion provided with two series of bores is shown in greater detail in FIGS. 7 to 10. The cushion in FIGS. 7 to 9 is rectangular, instead of circular, and the top and bottom surfaces are flat instead of crowned, but it is obvious that the specific shape of the cushion does not make any difference in the principles involved. As shown in FIGS. 7 to 9, the cushion 13 is provided with two series of bores 14 and 15 extending at right angles to each other. The intersecting bores 14 and 15 leave interior, spaced upstanding stabilizing supports 16 extending between the top and bottom portions, 17 and 18 respectively, of the cushion. The stabilizing supports are integral with the top and bottom portions of the cushion. Generally the bores are spaced fairly close to each other, and the cushion, in effect, comprises imperforate top and bottom portions spaced vertically from each other by a plurality of integral stabilizing supports.

As indicated at 19, each end of each support is curved on each side, except those sides flush with the peripheral surface of the cushion, to merge gradually into the interior surfaces of the top and bottom portions of the cushion. The curved merging ends of the supports, which add substantially to the stabilizing effect of the supports, is provided by the drilling operations regardless of the specific angular relationship between the bores. Another structural characteristic of the cushion that adds considerably to the strength of the supports is the fact that the supports are spaced together fairly closely and the supports are at least as thick as the width of the bores.

The stabilizing effect of the supports causes the cushion to compress in a vertical direction, when vertical pressure is applied to the top surface thereof, as, for example, when somebody sits on it, without allowing any appreciable slippage in a transverse direction between the top and bottom portions of the cushion. The supports are also effective to restore the cushion to its normal shape immediately upon release of the pressure applied thereto.

Although in each illustration the drills are of equal circumference and the spacing between adjacent drills is uniform, it will be understood that drills of different sizes may be used, and the spacing and angular relationship between adjacent drills may be varied to modify the compressibility of the cushion being drilled in any desired manner.

While I have described preferred embodiments of my invention in considerable detail, it will be understood that the description thereof is illustrative rather than restrictive, as many details may be modified or changed without departing from the spirit or scope of my invention. Accordingly, I do not desire to be restricted to the exact structure described.

I claim:

1. A method of making a cushion which comprises molding compressible cellular material into a predetermined shape, applying compressive force to said cushion in one direction, and drilling bores into said cushion at right angles to the direction of said compressive forces while said cushion is compressed.

2. A method of making a cushion which comprises molding compressible cellular material into a predetermined shape, applying compressive forces of different intensity to predetermined areas of said cushion in one direction, and drilling bores into said cushion at right angles to the direction of said compressive forces while said cushion is compressed.

3. A method of providing a compressible cushion with areas of predetermined different compressibility which compises forcing a tubular drill of uniform cross section through said cushion to remove portions of said compressible material from the body portion of said cushion, and applying pressure of varying intensity to said cushion at right angles to the direction of movement of said tubular drill while said drill is being forced therethrough, to vary the quantity of said compressive material removed from different areas of said cushion by said drill.

4. A method of making a cushion which comprises applying compression unequally over the top and bottom surfaces of a cushion of compressible cellular material, drilling bores through two peripheral edge portions of said cushion while maintaining the pressure on said cushion, the bores through one peripheral edge portion of said cushion being in angular relationship to the bores through said other peripheral edge portion.

5. A method of making a cushion which comprises foaming a polyurethane resinous material in a closed mold to impart a predetermined shape thereto, removing the cushion from said mold, applying compressive forces to the top and bottom surfaces of said cushion, and drilling a plurality of bores into said cushion through a peripheral edge thereof while said cushion is compressed.

6. A method of making a cushion which comprises foaming a polyurethane resinous material in a closed mold to impart a predetermined shape thereto, removing the cushion from said mold, applying varying compressive forces to predetermined areas of the top and bottom surfaces of said cushion, and drilling a plurality of bores into said cushion through a peripheral edge thereof while said cushion is compressed.

7. A method of making a cushion which comprises foaming a polyurethane resinous material in a closed mold to impart a predetermined shape thereto, removing the cushion from said mold, applying compressive forces of varying intensities to predetermined areas of the top and bottom surfaces of said cushion, and drilling a plurality of bores into said cushion in angular relationship to each other through a peripheral edge thereof while said cushion is compressed.

8. A method of making a cushion which comprises foaming a polyurethane resinous material in a closed mold to impart a predetermined shape thereto, removing the cushion from said mold, applying compressive forces to the top and bottom surfaces of said cushion, and drilling two series of bores into said cushion through two peripheral edge portions thereof while said cushion is under compression, the bores of one series intersecting the bores of said other series.

9. A method of making a cushion which comprises foaming a polyurethane resinous material in a closed mold to impart a predetermined shape thereto, removing the cushion from said mold, applying compressive forces of varying intensities to predetermined areas of the top and bottom surfaces of said cushion, and drilling two series of bores into said cushion through two peripheral edge portions thereof while said cushion is under compression, the bores of one series extending at right angles to the bores of said other series.

References Cited in the file of this patent

UNITED STATES PATENTS

| | | |
|---|---|---|
| 1,497,980 | Johnston | June 17, 1924 |
| 1,746,043 | Maguire | Feb. 4, 1930 |
| 1,983,464 | Kitchen | Dec. 4, 1934 |
| 2,375,518 | Bolle | May 8, 1945 |
| 2,802,530 | Kaufman | Aug. 13, 1957 |
| 2,822,599 | Webb | Feb. 11, 1958 |
| 2,902,091 | Dahle | Sept. 1, 1959 |
| 3,009,848 | Simon | Nov. 21, 1961 |

FOREIGN PATENTS

| | | |
|---|---|---|
| 552,739 | Belgium | Dec. 15, 1956 |
| 499,567 | Britain | Jan. 25, 1939 |